Patented June 18, 1935

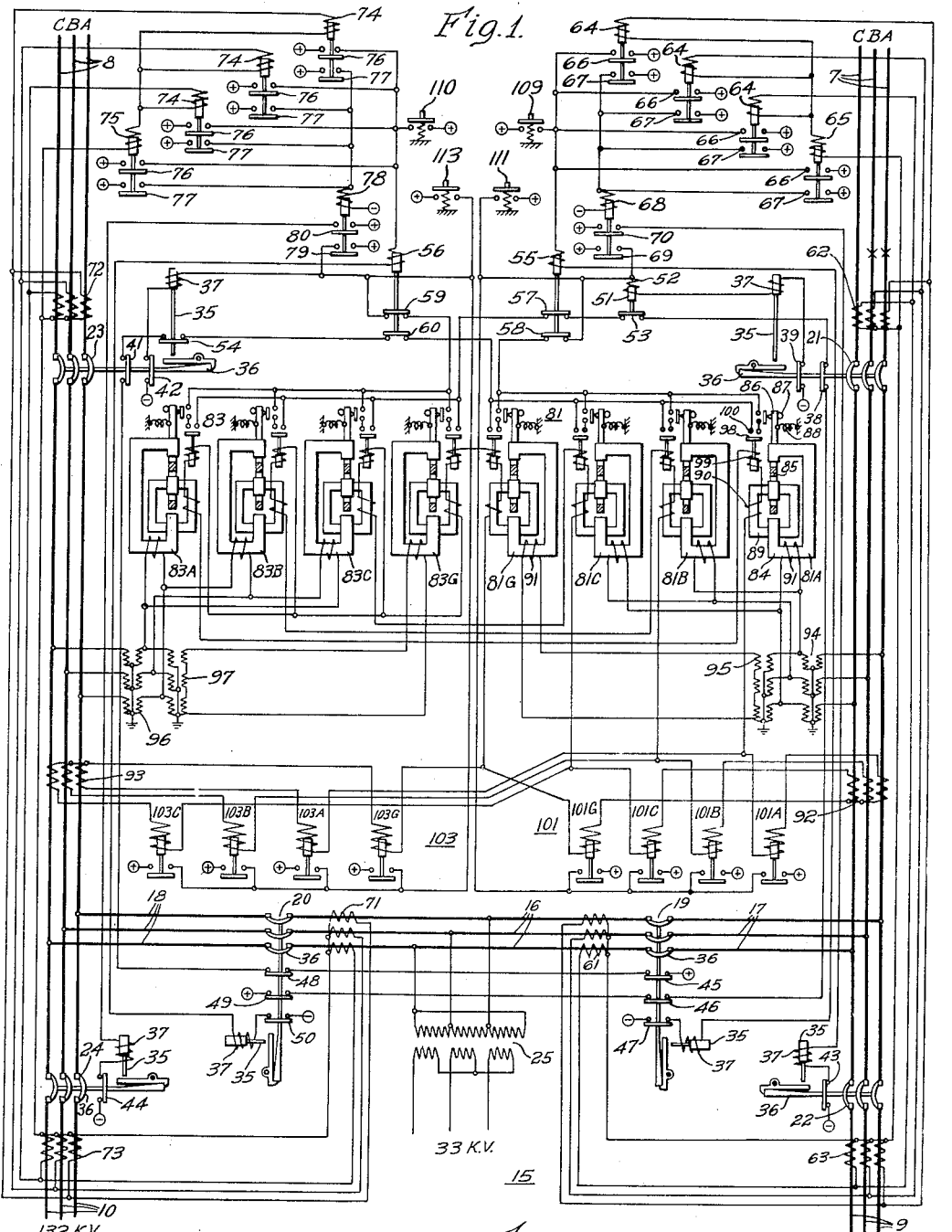

2,005,144

UNITED STATES PATENT OFFICE 2,005,144

RELAYING SYSTEM

Edward H. Klemmer, Wilkinsburg, Pa., assignor to Westinghouse Electric & Manufacturing Company, East Pittsburgh, Pa., a corporation of Pennsylvania Application December 22, 1933, Serial No. 703,609

15 Claims. (Cl. 175—294)

My invention relates to protective relaying means for a transmission line, and it has particular relation to the parallel line-section protection which is described in an article by E. G. Ralston and myself, published in the Electrical World for February 11, 1933, pages 192–195, and an article by F. S. Douglass and A. C. Monteith published in the Electric Journal for February, 1933, pages 55–59.

In a protective system utilizing high-speed relaying and high-speed circuit breakers it is necessary to take cognizance of the duration of the arcing period, realizing that one phase of a circuit breaker may cease arcing a half-cycle or more ahead of another phase carrying the fault-current, and also one circuit breaker may cease arcing several cycles before another circuit breaker which is also being tripped as a result of the same fault, even though both circuit breakers are energized simultaneously.

My invention relates particularly to means for preventing faulty operation as a result of a possible momentary reversal of power-flow during the brief period between the opening of one phase and the opening of another phase on a faulty line-section of a parallel-circuit distribution system.

My invention further relates to a particular type of parallel-circuit line in which the bus tying together the lines at one sub-station may become split by reason of the opening of a bus circuit breaker, in the event of a bus fault, thus causing an alteration in the directions of the currents fed into the fault from the adjoining line-sections, according as the bus circuit breaker is the first or the last to open. My invention provides means for assuring that interruption of a sound line-section shall not be obtained under such circumstances.

With the foregoing and other objects in view, my invention consists in the circuits, apparatus, systems, and methods hereinafter described and claimed, and illustrated in the accompanying drawing; wherein Figure 1 is a diagrammatic view of circuits and apparatus embodying my invention; and Fig. 2 is a simplified single-line diagram illustrative of the system to which my invention is applied.

Referring to Fig. 2, it will be seen that a source is provided, in the form of a synchronous generator G, which supplies energy to either one or both of two generator buses 3 and 4 through circuit breakers 5 and 6 respectively. I have illustrated a double-circuit transmission line having sending-end sections 7 and 8, and receiving-end sections 9 and 10. The sending end of line-section 7 is connected to either one or both of the generator buses 3 or 4 by means of circuit breakers 11 and 12, respectively. The sending end of the other line-section 8 may be connected to either one or both of the generator buses 3 or 4 through circuit breakers 13 and 14, respectively.

At an intermediate station indicated at 15 a split bus is provided, having a central bus-section 16 and end bus-sections 17 and 18, the latter being joined to the central bus-section 16 through bus circuit breakers 19 and 20, respectively. The end bus-section 17 is connected to the line-sections 7 and 9 through circuit breakers 21 and 22 respectively, and the bus-section 18 is connected to the line-sections 8 and 10 through circuit breakers 23 and 24 respectively. The intermediate bus-section 16 is shown as supplying power to a step-down power transformer 25.

A third station is shown in Fig. 2, as indicated by the numeral 26. At this station another split bus is provided, consisting of two bus-sections 27 and 28 joined together by a bus circuit breaker 29. The bus-section 27 is connected to the receiving end of the line-section 9 through a circuit breaker 30, and it is also shown as being connected to a further line-section 31 through a circuit breaker 32. The other bus-section 28 is connected to the receiving end of the line-section 10 through a circuit breaker 33 and it is also shown as being connected to a step-down power transformer 34.

Fig. 1 shows in detail some of the equipment at the intermediate station 15, showing the receiving ends of the incoming line-sections 7 and 8 and the sending ends of the outgoing sections 9 and 10, with the relaying equipment for the incoming circuit breakers 21 and 23 and for the bus circuit breakers 19 and 20. The protective equipment for the outgoing circuit breakers 22 and 24 is not shown in detail as it is, or may be, merely a repetition of the equipment for the line circuit breakers 21 and 23.

In Fig. 1 the transmission system is illustrated as being a three-phase system having phases or line-conductors which are designated A, B, C. Each of the circuit breakers 19, 20, 21, 22, 23 and 24 is provided with a tripping mechanism 35 and a current-interrupting arcing mechanism 36. The tripping mechanism includes, in each case, a tripping coil 37. The incoming line circuit breakers 21 and 23 are each shown as having two auxiliary switch contact members carried by the arcing mechanism 36, said auxiliary switches being designated by the numerals 38 and 39 in the case of the breaker 21, and 41 and 42 in the case of the breaker 23. The out-going line breakers 22 and 24 are shown as having only one similar auxiliary switch, designated 43 and 44, respectively, the other auxiliary switch being left out of the illustration because the means for tripping these breakers in response to line faults are not shown in detail. Each of the bus circuit breakers 19 and 20 is provided with three auxiliary switches on the main contact mechanism 36 thereof, as indicated by the numerals 45, 46 and 47, in the case of the breaker 19, and 48, 49 and 50 in the case of the breaker 20.

The incoming line circuit breaker 21 is also associated with an auxiliary relay 51 having an operating coil 52 which is energized whenever the tripping coil 37 of said breaker 21 is energized, being connected either in series or in parallel thereto, or in any equivalent connection, the series connection being illustrated. The auxiliary relay 51 carries a contact element 53 which quickly opens as soon as the tripping coil 37 of the breaker 21 is energized, thus opening much more quickly than the auxiliary switches 38 and 39 which are carried by the heavy arcing-contact-carrying parts 36.

The other incoming line breaker 23 is not illustrated as being associated with an auxiliary relay such as 51, but in lieu thereof it has an auxiliary switch contact-member 54 which is mounted on the tripping mechanism 35 of said circuit breaker 23, so that this auxiliary switch 54 opens instantly as soon as the tripping mechanism 35 of this circuit breaker 23 is actuated.

The bus circuit breakers 19 and 20 are also provided with quickly responsive auxiliary relays 55 and 56, respectively, which are energized simultaneously with the tripping mechanisms 35 of the bus circuit breakers 19 and 20, respectively. The auxiliary relay 55 has two contact members 57 and 58, and the auxiliary relay 56 has two contact members 59 and 60.

I have illustrated my invention in connection with means for protecting the bus-sections 17 and 18 against bus faults, and for protecting the line-sections 7 and 8 against line faults. In general, other relaying equipment will also be utilized, giving protection to the central bus-section 16 and power transformer 25, as well as the other two line-sections 9 and 10. My invention is sufficiently illustrated, however, in connection with the two protective systems illustrated.

Bus differential protection is provided for the bus-section 17 by means of a set of differentially connected current transformers 61, 62 and 63 which are connected around the circuit breakers 19, 21 and 22, respectively. When there is no fault on the bus-section 17 the total current of these current transformers adds to zero. Any unbalancing of the current is utilized to actuate one or more of three phase-connected bus differential relays 64 or a neutral bus differential relay 65. Each of these bus differential relays 64 and 65 has two contacts 66 and 67. All of the contacts 66 are connected in parallel and are utilized to energize the tripping mechanism 35 of the bus circuit breaker 19 and its associated auxiliary relay 55. All of the contacts 67 are connected in parallel and are utilized to energize an auxiliary tripping relay 68 which introduces a slight time-hesitation of one to three cycles before it picks up its contacts 69 and 70 which are utilized to energize the tripping mechanisms of the line circuit breakers 21 and 22 respectively, the auxiliary relay 51 being energized simultaneously with the tripping mechanism of the line breaker 21.

The other terminal bus-section 18 is similarly protecting by differential current transformers 71, 72 and 73, and bus differential relays 74 and 75. The latter have contacts 76 and 77, the former being utilized to energize the tripping mechanism of the bus circuit breaker 20 and its associated auxiliary relay 56, while the differential relay contacts 77 are utilized to energize an auxiliary tripping relay 78 similar to the relay 68, and having contacts 79 and 80 which energize the tripping mechanisms of the line circuit breakers 23 and 24 respectively.

The in-coming lines 7 and 8 are protected by means of line-protective relaying equipment comprising instantaneous current-differential fault-responsive directional relays 81A, 81B, 81C, 81G for controlling the line circuit breaker 21 and other similar relays 83A, 83B, 83C, 83G for controlling the line circuit breaker 23. These current-differential directional relays are illustrated as being of the dynamometer type described and claimed in a patent to S. L. Goldsborough No. 1,934,664, patented November 7, 1933.

Structurally, the current-differential directional relays 81 and 83, as illustrated in the case of the relay 81A, each comprise a frame member 84 in which magnetic flux is produced, traversing air gaps in which lie the coil-sides of a light aluminum single-coil rotor-member 85 carrying a contact-arm 86 which is normally biased against a back-stop 87 by means of a light spring 88. Current is induced in the rotor-loop 85 by means of a stationary transformer core 89, one side of which threads through the rotor-loop 85. The transformer core 89 is excited by means of one or more current-windings 90, while the field frame 84 is energized by one or more directional coils 91.

The current-windings 90 of the several line differential relays 81 and 83 are energized in accordance with the difference between the line currents in the line-sections 7 and 8, by means of two differentially connected current transformers 92 and 93. The relays are responsive respectively to the line-currents in phases A, B and C and to the ground or neutral current, as indicated by the letters A, B, C and G, respectively.

The directional coils 91 of the several line differential relays 81 and 83 are suitably energized from any source which will afford a basis of comparison to determine the directions of the currents in the several current-coils 80. As illustrated, the directional windings 91 of the line differential relays 81A, 81B, and 81C are energized in accordance with the phase-to-phase voltages of the line 7, which lag behind the line-currents A, B, C respectively by 30° when the line power-factor is 100%. Energy for these directional windings 91 is supplied by means of potential transformers 94. The directional winding 91 of the line directional relay 81G is energized from the open-delta secondary winding of an auxiliary potential transformer 95. Corresponding potential transformers 96 and 97 are provided for the line 8 and the line differential relays 83.

The directions of energization of the several windings of the line-differential relays 81A, 81B, 81C and 81G are such that the relays will develop a torque tending to close their contact-members 86 when fault-current is flowing out into the line-section 7, away from the bus 16, 17 and 18. The other line differential relays 83A, 83B, 83C and 83G are arranged to close their contact-members 86 when fault-current is flowing out into the line-section 8, away from bus 16, 17 and 18.

In general, the eight line differential relays 81 and 83 will each embody, as an integral part thereof, or associated with, an auxiliary fault-responsive relay 98 shown as being of the over-current type having an operating coil 99 connected in series with the current coil 90 of the line directional relay with which it is associated, and having contacts 100 which are connected in series with the contacts 86 of the line directional relay with which it is associated. These overcurrent relays 98 are set to respond to a current higher than the maximum load current which will be carried by one of the lines 7 or 8 operating by itself, with the other line out of service.

The four pairs of serially connected contacts 86 and 100 of the line directional relays 81A, 81B, 81C and 81G are all connected in parallel and are utilized to energize the tripping mechanism of the line circuit breaker 21 and its associated auxiliary relay 51. This tripping circuit is not completed, however, unless both of the bus circuit breakers 19 and 20 are closed and unless the other parallel line circuit breaker 23 is closed, and also unless the tripping mechanisms of all three of these circuit breakers 19, 20 and 23 are deenergized, so that none of said circuit breakers are in the process of opening.

This lockout protection is obtained by including in series with the group of contacts 86 and 100 of the four line directional relays 81A, 81B, 81C and 81G, the auxiliary switches 45, 48 and 41 previously described, which are open when the corresponding circuit breakers are fully opened, and the auxiliary switch-contacts 58, 60 and 54, which open as soon as the respective tripping mechanisms of the circuit breakers are energized.

The four pairs of serially connected contacts 86 and 100 of the line directional relays 83A, 83B, 83C and 83G are all connected in parallel and are utilized to energize the tripping mechanism of the line circuit breaker 23. This tripping circuit includes the auxiliary breaker switches 49, 46 and 38 of the bus circuit breakers 20 and 19 and the other parallel-line circuit breaker 21 respectively, and also the relay-contacts 59, 57 and 53 of the auxiliary relays 56, 55 and 51 associated with these three circuit breakers.

Back-up protection is provided for the line-sections 7 and 8 by means of suitable relays which I have indicated, by way of example, as overcurrent relays 101A, 101B, 101C and 101G for the line circuit breaker 21 and 103A, 103B, 103C and 103G for the line circuit breaker 23. These relays may be induction relays, either with or without current-directional operation, as may be necessary according to the power-connections of the transmission system, and with inverse-current time-selection so that, with one line 7 or 8 out of service, a fault on the remaining line will be properly cleared. The contacts of the four back-up relays 101 are all connected in parallel and are utilized to directly energize the trip circuit of the line circuit breaker 21 and its associated auxiliary relay 51. The contacts of the four back-up relays 103 are likewise connected in parallel and utilized to directly trip the line circuit breaker 23.

I have also illustrated, at the top center of Fig. 1, pushbutton means 109, 110, 111 and 113 for directly tripping the circuit breakers 19, 20, 21 and 23, respectively, and for simultaneously energizing the auxiliary relays 55, 56 and 51 which are associated with the breakers 19, 20 and 21, respectively.

The principal point in the provisions which I have made for the differential bus protection is in the means for ensuring that the bus circuit breaker 19 or 20 will always finish arcing before the corresponding line circuit breakers 21 and 22 or 23 and 24, as the case may be. This function is secured by means of the auxiliary tripping relays 68 and 78 which introduce a time-hesitation of the requisite amount before energizing the tripping circuits of the respective line circuit breakers.

The reason for this provision which I have made, to cause the bus circuit breaker to open before the line circuit breakers, will best be explained by reference to Fig. 2.

If it be assumed, for example, that a contrary operation be obtained, and that the line circuit breaker 21 opens before the bus circuit breaker 19 in the event of a fault on the bus 17, it will be observed that, in the interval of a fraction of a cycle or more which intervenes with the bus breaker arcing and carrying current into the fault on the bus 17, while the line breaker 21 is open, current will flow from the generator-bus 3 or 4, or both, over the sound line 8, through the bus breaker 19 into the faulty bus 17, thus actuating the quick-acting protective relaying equipment which trips the circuit breaker 13 or 14, or both, at the generator end, with the result that both lines 7 and 8 are put out of service. This operation, resulting from the line circuit breaker 21 stopping arcing shortly before the bus circuit breaker 19, may easily occur if the tripping circuits of the two breakers are energized simultaneously. However, it is of utmost importance that the breaker 13 or 14 at the other end of the sound line 8 shall not trip, as its opening will interrupt service to the intermediate station 15.

According to my invention, it is impossible for the line circuit breaker 21 to open, or cease arcing, before the bus circuit breaker 19 under the conditions just described. The bus circuit breaker 19 opens first, and in the brief interval before the line circuit breaker 21 opens, it will be observed that the main fault-current from the generator G is flowing over the faulty line 7 through the circuit breaker 21 into the faulted bus 17, although a smaller amount of fault-current also flows from the generator G over the sound line 8 and on into line-section 10, bus 28—27, and the line-section 9, back into the fault, provided that the circuit breaker 22 is also arcing or carrying current. The strongly predominating fault current at the generator end of faulty line-section 7 will suffice to operate the line differential protective relaying equipment and trip out the line breaker 11 or 12 which is supplying power to the line-section 7, thus leaving the sound line 8 in service, which is the operation desired.

The principal point in the provisions which I have made for the differential line protection is in the means for ensuring that there shall be no possibility of faulty operation in case an actuated line circuit breaker, such as 21 or 23, shall cease arcing a half cycle or more ahead of its auxiliary switch, such as the auxiliary switch 38 of the breaker 21 in Fig. 1 of the accompanying drawing. This is particularly necessary in a system utilizing high-speed breakers and relays, where even a half of a cycle is often sufficient to produce faulty relay operation. It has been known heretofore, as described in a patent to Paul MacGahan, No. 1,504,568, patented August 12, 1924, that it is desirable to provide means for permitting the sequential operation of the circuit breakers at the two ends of a line-section, in the event of a fault near one end of said linesection, and to lock out the differential protective relaying equipment, at the end which opens first, for a length of time sufficient to permit the other end of the faulty line-section to clear, so as to prevent the sound parallel line from being opened as a result of the reverse energy-flow which follows the opening of the faulty-line circuit breaker nearest the fault before the opening of the circuit breaker at the far end of the faulty line.

According to my invention, I utilize both the ordinary auxiliary switch, as 38 or 41, on the breaking arcing mechanism, and an auxiliary lockout 53 or 54 responsive to the tripping function. The function of my auxiliary lockout 53 or 54 is to introduce only a brief lockout function in the sound-line tripping action, and this lockout needs to be effective only until my permanent lockout 38 or 41 becomes effective.

My present invention has to do with a different circumstance. If it be assumed, for instance, that a double ground fault occurs on the line 7 at or close to the intermediate station 15, as indicated at XX in Fig. 1, it is quite likely to happen that one of the poles A or B of the line circuit breaker 21 will cease arcing ahead of the other. During the brief half-cycle or more during which one of the poles of the circuit breaker is open-circuited, say phase B, while the other pole is carrying current in phase A, it will be observed that the current in phase B of the sound line 8 will no longer be coming in over the sound line 8, into the bus 18, 16, 17, and thence through the circuit breaker 21 into the fault, but the phase-B current from the generator G (Fig. 2) will have to all come in from the generator end of the faulty line 7, whereas phase-B current will also flow, in the reverse direction, from the generating equipment or rotating machines at substations 15 and 26, flowing outwardly from the bus 18 over the sound line 8, thereby creating a situation which may well produce an operation of the residual current line-directional relay 83G, tripping the sound-line breaker 23. It is necessary, therefore, to provide means which will interrupt the tripping current of the sound-line breaker 23, which is controlled by the residual current differential relay 83G, before any phase of the faulty-line circuit breaker 21 shall cease arcing, and this I have done by means of the auxiliary relay 51 which is energized simultaneously with the tripping coil 37 of the circuit breaker 21.

According to my invention, the groups of line differential relays 81 and 83 are locked out, not only during the tripping and arcing operations of the various line circuit breakers, but also permanently, at least as long as one of the line circuit breakers at the relaying station is open. This result is brought about, if the auxiliary switch-contacts 53 and 54 are not of the automatic latching type, by providing the auxiliary switch-contacts 38 and 41 on the circuit interrupting or arc-contact-carrying mechanisms 36 of the two line circuit breakers 21 and 23. These auxiliary switch-contacts 38 and 41 open at or near the close of the movement of these massive contact-carrying mechanisms, or some time during the movement thereof, so that the auxiliary switch-contacts stay open as long as the circuit breaker is open, although they cannot be relied upon to open before the cessation of arcing at the main line-current contacts.

When a faulty line-section has been tripped out, I dispense with the differential line protective relaying equipment 81 and 83 altogether, relying, instead, on auxiliary back-up protection such as that which is illustrated by the groups of relays 101 and 103.

Since one of the lines 7 or 8 is taken out of service as a result of a bus fault on the bus-section 17 or 18 as the case may be, it is also desirable to take the line differential relaying equipment 81—83 out of service when a bus fault occurs, and I have shown means for doing this as soon as the tripping mechanism of the bus circuit breaker 19 or 20 is energized, rather than waiting for the circuit breaker to be entirely opened at which time its auxiliary contacts 45, 46 or 48, 49 will open. The quick-acting lockout means associated with the bus breakers 19 and 20 are the auxiliary relays 55 and 56, carrying contacts which are in series with the tripping circuits of the line circuit breakers 21 and 23 and the respective line differential relaying equipments 81 and 83, so that the latter are promptly taken out of commission in order to avoid any possibility of faulty operation as a result of a simultaneous fault on the bus 17 or 18 and on one of the lines 7 or 8.

It will be understood that the diagrams which I have illustrated are more or less simplified and idealized and are selected for the purpose of illustrating the principles of my invention. It will be obvious to those skilled in the art that various changes and modifications may be resorted to, as well as additional refinements of control and protection, without departing from the essential spirit and operation of my invention. I desire, therefore, that the appended claims shall be accorded the broadest interpretation consistent with their language and the prior art.

I claim as my invention:

1. Protective relaying means for a transmission line, said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections; said protective relaying means comprising fault-responsive directional relaying equipment for controlling each of said line circuit-interrupters, and bus differential relaying equipment for controlling the circuit-interrupters connected to each of said bus-sections in the event of a bus fault; said bus differential relaying equipment comprising means for quickly actuating the affected bus circuit-interrupter to open the same, time-hesitation means for less quickly actuating the affected line circuit-interrupter to open the same in such manner that the bus circuit-interrupter will cease carrying current first, and means for preventing some of the fault-responsive directional relaying equipment for the line-section connected to the unfaulted bus-section at the same station from operating falsely during the interval between the current-interruptions in the bus circuit-interrupter and the line circuit-interrupter which are controlled by said bus differential relaying equipment.

2. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections; said protective relaying means comprising fault-responsive directional relaying equipment for controlling each of said line circuit-interrupters, bus differential relaying means responsive to a fault on one of the bus-sections, means responsive to said bus differential relaying means for quickly actuating the affected bus circuit-interrupter to open the same, time-hesitation means responsive to said bus differential relaying means for less quickly actuating the affected line circuit-interrupter to open the same in such manner that the bus circuit-interrupter will cease carrying current first, and means responsive to said bus differential relaying means for preventing the fault-responsive directional relaying equipment for the line-section connected to the unfaulted bus-section at the same station from operating falsely during the interval between the current-interruptions in the bus circuit-interrupter and the line circuit-interrupter which are controlled by said bus differential relaying equipment.

3. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of said line-sections; said protective relaying means comprising fault-responsive directional relaying equipment for controlling each of said line circuit-interrupters, bus differential relaying means responsive to a fault on one of the bus-sections, means responsive to said bus differential relaying means for quickly actuating the affected bus circuit-interrupter to open the same, time-hesitation means responsive to said bus differential relaying means for less quickly actuating the affected line circuit-interrupter to open the same in such manner that the bus circuit-interrupter will cease carrying current first, and means operable substantially simultaneously with the actuation of said line circuit-interrupter for preventing the fault-responsive directional relaying equipment for the line-section connected to the unfaulted bus-section at the same station from operating falsely during the interval between the current-interruptions in the bus circuit-interrupter and the line circuit-interrupter which are controlled by said bus differential relaying equipment.

4. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each of said line-sections, said line circuit-interrupters comprising tripping mechanisms and circuit-interrupting arcing mechanisms; said protective relaying means comprising fault-responsive directional relaying equipment for controlling each of said line circuit-interrupters, bus differential relaying means responsive to a fault on one of the bus-sections, means responsive to said bus differential relaying means for quickly actuating the affected bus circuit-interrupter to open the same, time-hesitation means responsive to said bus differential relaying means for less quickly actuating the affected line circuit-interrupter to open the same in such manner that the bus circuit-interrupter will cease carrying current first, and auxiliary means mechanically associated with the tripping mechanism of the affected line circuit-interrupter for preventing the fault-responsive directional relaying equipment for the line-section connected to the unfaulted bus-section at the same station from operating falsely during the interval between the current-interruptions in the bus circuit-interrupter and the line circuit-interrupter which are controlled by said bus differential relaying equipment.

5. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections, said line circuit-interrupters comprising tripping mechanisms and circuit-interrupting arcing mechanisms; said protective relaying means comprising fault-responsive relaying means energized simultaneously with the tripping mechanism of the affected line circuit-interrupter for preventing the fault-responsive directional relaying equipment for the line-section connected to the unfaulted bus-section at the same station from operating falsely during the interval between the current-interruptions in the bus circuit-interrupter and the line circuit-interrupter which are controlled by said bus differential relaying equipment.

6. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections, said line circuit-interrupters comprising tripping mechanisms and circuit-interrupting arcing mechanisms; said protective relaying means comprising current-differential fault-responsive directional relaying equipment for selectively controlling the line circuit-interrupters at each station while the lines are operating in parallel, fault-responsive relaying equipment for controlling the several line circuit-interrupters when one line is operating singly, bus differential relaying means responsive to a fault on one of the bus-sections, means responsive to said bus differential relaying means for quickly actuating the affected bus circuit-interrupter to open the same, time-hesitation means responsive to said bus differential relaying means for less quickly actuating the affected line circuit-interrupter to open the same in such manner that the bus circuit-interrupter will cease carrying current first, and means automatically operative substantially simultaneously with the actuation of the tripping mechanism of the affected line circuit-interrupter for quickly and permanently preventing the current-differential relaying equipment at that station from further circuit-interrupter actuation while only one of said line-sections is in service.

7. Protective relaying means for a transmission line; said line comprising at least two line-sections capable of being operated in parallel between two stations, a bus at each of said stations for connecting said line-sections together, and a line circuit-interrupter for each end of each of said line-sections, said line circuit-interrupters comprising tripping mechanisms and circuit-interrupting arcing mechanisms; said protective relaying means comprising current-differential fault-responsive directional relaying equipment for selectively controlling the line circuit-interrupters at each station while the lines are operating in parallel, fault-responsive relaying equipment for controlling the several line circuit-interrupters when one line is operating singly, and means automatically operative substantially simultaneously with the actuation of the tripping mechanism of an actuated line circuit-interrupter for quickly and permanently preventing the current-differential relaying equipment at that station from further circuit-interrupter actuation while only one of said line-sections is in service.

8. Protective relaying means for a transmission line, said line comprising at least two line-sections capable of being operated in parallel between two stations, a bus at each of said stations for connecting said line-sections together, and a line circuit-interrupter for each end of each of said line-sections, said line circuit-interrupters comprising tripping mechanisms and circuit-interrupting arcing mechanisms; said protective relaying means comprising current-differential fault-responsive directional relaying equipment for selectively controlling the line circuit-interrupters at each station while the lines are operating in parallel, fault-responsive relaying equipment for controlling the several line circuit-interrupters when one line is operating singly, auxiliary means mechanically associated with the tripping mechanism of an actuated line circuit-interrupter for also preventing said current-differential relaying equipment from circuit-interrupter actuation.

9. Protective relaying means for a transmission line; said line comprising at least two line-sections capable of being operated in parallel between two stations, a bus at each of said stations for connecting said line-sections together, and a line circuit-interrupter for each end of each of said line-sections, said line circuit-interrupters comprising tripping mechanisms and circuit-interrupting arcing mechanisms; said protective relaying means comprising current-differential fault-responsive directional relaying equipment for selectively controlling the line circuit-interrupters at each station while the lines are operating in parallel, fault-responsive relaying equipment for controlling the several line circuit-interrupters when one line is operating singly, quickly acting auxiliary relay means, means for energizing said auxiliary relay means substantially simultaneously with the energization of the tripping mechanism of an actuated line circuit-interrupter, means responsive to said auxiliary relay means for quickly preventing the current-differential relaying equipment at that station from circuit-interrupter actuation, and further auxiliary means mechanically associated with the circuit-interrupting mechanism of the actuated line circuit-interrupter for also preventing said current-differential relaying equipment from circuit-interrupter actuation.

10. Protective relaying means for a transmission line; said line comprising at least two line-sections capable of being operated in parallel between two stations, a bus at each of said stations for connecting said line-sections together, and a line circuit-interrupter for each end of each of said line-sections, said line circuit-interrupters comprising tripping mechanisms and circuit-interrupting arcing mechanisms; said protective relaying means comprising circuit-make-and-break means mechanically associated with the circuit-interrupting mechanism of each of said circuit-interrupters for responding to the condition of its circuit-interrupter, other circuit-make-and-break means responsive quickly to the energization of the tripping mechanism of each of said circuit-interrupters, current-differential fault-responsive directional relaying equipment for selectively controlling the line circuit-interrupters at each station while the lines are operating in parallel, fault-responsive relaying equipment for controlling the several line circuit-interrupters when one line is operating singly, and means associated with the circuit-make-and-break means responsive to both the circuit-interrupting mechanism and the trip mechanism at each station for preventing each line circuit-interrupter from being tripped by its current-differential relaying equipment when one of the other aforesaid circuit-interrupters at that station is either open or has its tripping mechanism actuated in the process of opening.

11. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two-line sections whereby said bus may be split into two bus-sections, and a line circuit-interrupter for each end of each of said line-sections, each of said line and bus circuit-interrupters having a tripping mechanism and a circuit-interrupting arcing mechanism; said protective relaying means comprising circuit-make-and-break means mechanically associated with the circuit-interrupting mechanism of each of said circuit-interrupters for responding to the condition of its circuit-interrupter, other circuit-make-and-break means responsive quickly to the energization of the tripping mechanism of each of said circuit-interrupters, current differential fault-responsive directional relaying equipment for selectively controlling the line circuit-interrupters at each station while the lines are operating in parallel, fault-responsive relaying equipment for controlling the several line circuit-interrupters when one line is operating singly, and means associated with the circuit-make-and-break means responsive to both the circuit-interrupting mechanism and the trip mechanism at each station for preventing each line circuit-interrupter from being tripped by its current-differential relaying equipment when one of the other aforesaid circuit-interrupters at that station is either open or has its tripping mechanism actuated in the process of opening.

12. Protective relaying means for a transmission system comprising at least two circuit-breakers each having a tripping mechanism and a circuit-interrupting arcing mechanism, relay means for tripping one of the circuit-breakers, the other circuit-breaker having an auxiliary switch carried by its tripping mechanism, and means responsive to said auxiliary switch for preventing said relay means from tripping its circuit breaker.

13. Protective relaying means for a transmission system comprising at least two circuit-breakers each having a tripping mechanism and a circuit-interrupting arcing mechanism, relay means for tripping one of the circuit-breakers, the other circuit-breaker having an auxiliary contact-make-and-break apparatus responsive to the initial actuation of the tripping mechanism and remaining responsive for a time thereafter, and means responsive to said auxiliary contact-make-and-break apparatus for preventing said relay means from tripping its circuit breaker.

14. Protective relaying means for a transmission line; said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections; said protective relaying means comprising fault-responsive directional relaying equipment for controlling each of said line circuit interrupters, and bus differential relaying equipment for controlling the circuit-interrupters connected to each of said bus-sections in the event of a bus fault; said bus differential relaying equipment comprising means for quickly actuating the affected bus circuit-interrupter to open the same, auxiliary contact-make-and-break apparatus responsive to the initial actuation of said bus circuit-interrupter, and means responsive to said auxiliary contact-make-and-break apparatus for preventing some of said relaying equipment from tripping a line circuit-interrupter.

15. Protective relaying means for a transmission line, said line comprising at least two line-sections capable of being operated in parallel between two stations, a bus at each of said stations for connecting said line-sections together, at least one bus circuit-interrupter for at least one of said busses interposed in said bus between the two line-sections whereby said bus may be split into two bus-sections, and a line circuit-interrupter for each end of each of said line-sections; said protective relaying means comprising fault-responsive directional relaying equipment for controlling each of said line circuit-interrupters, and bus differential relaying equipment for controlling the circuit-interrupters connected to each of said bus-sections in the event of a bus fault; said bus differential relaying equipment comprising means for quickly actuating the affected bus circuit-interrupter to open the same, and time-hesitation means for less quickly actuating the affected line circuit-interrupter to open the same in such manner that the bus circuit-interrupter will cease carrying current first.

EDWARD H. KLEMMER.